United States Patent [19]

Nolen

[11] Patent Number: 4,983,285
[45] Date of Patent: Jan. 8, 1991

[54] INDIVIDUAL WASTEWATER TREATMENT PLANT

[76] Inventor: H. Eugene Nolen, 400 Spalitta La., Hammond, La. 70403

[21] Appl. No.: 870,701

[22] Filed: Jun. 4, 1986

[51] Int. Cl.$^5$ .............................................. C02F 3/22
[52] U.S. Cl. ..................... 210/197; 210/207; 210/220; 210/256
[58] Field of Search ................ 210/195.3, 197, 205, 210/207, 220, 256, 261, 532.2

[56] References Cited

U.S. PATENT DOCUMENTS

| | | | |
|---|---|---|---|
| 2,796,176 | 6/1957 | Monson | 210/261 |
| 3,118,834 | 1/1964 | Southworth et al. | 210/256 X |
| 3,419,491 | 12/1968 | Messa | 210/256 X |
| 3,658,176 | 4/1972 | Reid | 210/532.2 X |
| 4,259,185 | 3/1981 | Mixon | 210/261 X |

Primary Examiner—Tom Wyse
Attorney, Agent, or Firm—C. Emmett Pugh

[57] ABSTRACT

An individual wastewater treatment plant 1 including an aeration piping sub-system 27, 28 and an inverted, cone-shaped clarifier 13 concentrically suspended within an outer tank 10, the clarifier being supported by a support grid of standard-type PVC plastic pipe elements, including a series of four radially disposed pipe sections 21 engaging the clarifier and supporting and positioning the aeration piping system. The aeration piping is force fitted into "U" shaped slots formed in the support grid. Two embodiments for the clarifier engagement and support sub-system are disclosed, one using a series of peripherally spaced, thin slotted, inverted "T" elements 23 (FIG. 4) and the other using radial pipe sections 30 extending through the wall of the clarifier (FIG. 6), with the latter using a side-ways "U" slot 31 to hold the aeration piping and the first embodiment using inverted "U" 26 slots formed in the bottom of additional "T" elements 25 (FIG. 3). Anchored pipe sleeves are cast in place in the concrete tank walls (FIG. 5) for separately coupling the inlet and outlet lines 17, 18 through the wall.

9 Claims, 4 Drawing Sheets

INDIVIDUAL WASTEWATER TREATMENT PLANT

BACKGROUND OF INVENTION

1. Field of Invention

The present invention relates to individual wastewater treatment plants and more particularly to ones which are typically buried in the ground and have an inner clarifier unit, usually conical in shape and centrally located, supported within and by supports from the outer tank, and even more particularly to the supporting structure for the clarifier unit and the aeration piping of the plant within the tank.

2. Prior Art & General Background

Individual wastewater treatment systems for use in association with individual homes, businesses and the like are well known and accepted.

In an exemplary prior art system, which the present invention specifically improves upon, a cylindrically shaped concrete tank is buried in the ground, within which is concentrically supported an inverted, conically-shaped clarifier. The clarifier creates a relatively isolated, non-turbulent liquid area, from which the treated water is withdrawn by overflow from the top. In such a system the centrally located clarifier cone, typically made of fiberglass, has been supported by a series of coated metal clips, which in due course have corroded and failed well prior to the expected life of the other components. Additionally, the piping of the aeration system included along the periphery of the outer tank has been rather awkward in its design, requiring side-wall anchoring and supplemental fastenings. As a result the prior art system has not been as reliable as desirable, and requires a greater amount of labor and expense in installation and/or manufacture than is achieved in the present invention.

Other examples of various types of wastewater treatment systems or septic tanks or other types of systems are found in the following prior patents:

| Patent No. | Patentee(s) | Issue Date |
|---|---|---|
| 1,692,446 | J. Himmioff | Nov 20, 1928 |
| 1,797,697 | C. H. Ryman | Mar 24, 1931 |
| 2,213,458 | D. H. Buckley | Sep 3, 1940 |
| 2,638,444 | S. E. Kappe | May 12, 1953 |
| 2,695,710 | F. S. Gibbs | Nov 30, 1954 |
| 2,987,187 | D. W. Burgoon et al | Jun 6, 1961 |
| 3,031,083 | A. Schreiber | Apr 24, 1962 |
| 3,057,796 | C. Davis | Oct 9, 1962 |
| 3,149,071 | D. W. Burgoon et al | Sep 15, 1964 |
| 3,153,682 | J. D. Walker | Oct 20, 1964 |
| 3,773,179 | G. E. Hurst | Nov 20, 1973 |
| 3,799,346 | R. Freese | Mar 26, 1974 |
| 3,804,255 | R. E. Speese | Apr 16, 1974 |
| 3,807,565 | W. C. Langston et al | Apr 30, 1974 |
| 3,826,376 | A. L. Carlson et al | Jul 30, 1974 |
| 3,875,066 | J. H. Lind | Apr 1, 1975 |
| 3,919,086 | D. F. Peck et al | Nov 11, 1975 |
| 3,923,656 | J. R. Krebs et al | Dec 2, 1975 |
| 3,936,381 | J. Pacaud | Feb 3, 1976 |
| 3,956,128 | A. B. Turner | May 11, 1976 |
| 4,002,561 | C. E. Traverse | Jan 11, 1977 |
| 4,054,524 | S. Mackrle et al | Oct 18, 1977 |
| 4,059,524 | J. Chataigner | Nov 22, 1977 |
| 4,066,722 | J. J. Pietruszewski | Jan 3, 1978 |
| 4,093,549 | H. L Wilson | Jun 6, 1978 |
| 4,097,380 | K. Carlson | Jun 27, 1978 |
| 4,132,643 | A. O. Hellqvist | Jan 2, 1979 |
| 4,259,182 | R. E. Belveal | Mar 31, 1981 |
| 4,259,185 | J. A. Mixon | Mar 31, 1981 |
| 4,337,152 | J. F. Lynch | Jun 29, 1982 |
| 4,341,630 | S. Mackrle et al | Jul 27, 1982 |
| 4,390,422 | S. Mackrle, et al | Jun 28, 1983 |
| 4,505,813 | J. D. Graves | Mar 19, 1985 |
| 4,585,556 | V. Mackrle et al | Apr 29, 1986 |

However, none of these prior patents teach any significant structure with respect to the innovative support grid-structure for the clarifier unit and/or for the aeration piping sub-system of the present invention.

For example, in the Burgoon et al patent No. (3,149,071) and the Walker patent No. (3,152,682) the piping is apparently made of steel and is integrated into the concrete wall structure and/or bolted to the bottom of the tank. Mackrle et al No. (4,054,524) apparently suspends his aeration piping from above from the top of a horizontal, cylindrical tank; while Belveal No. (4,259,182) apparently suspends metal piping down in a water treatment apparatus. Note also in this regard the patents to Mixon No. (4,259,185) and to Lynch No. (4,337,152).

GENERAL, SUMMARY DISCUSSION OF THE INVENTION

The present invention overcomes these prior art problems by providing a system which is highly reliable, relatively economical in manufacture and very cost effective in installation. It achieves these highly desirable goals by utilizing for example a upper grid-work of plastic, polyvinylchloride (PVC) piping supporting the upper edges of the clarifier and positioning the downwardly extending aeration piping, preferably as an integral part thereof.

In a first embodiment the grid-work includes a set of slotted "T" members (FIG. 4) into which the peripheral edge of the clarifier fits and is held, and in a second embodiment the horizontally extended side members of the grid pass through the side wall(s) of the clarifier, supporting it and the aeration piping (FIG. 6).

The grid-work can form a simple cross (note FIG. 2) made up of standard, off-the-shelf PVC components with minor alterations, or merely made from a series of spaced, horizontally-disposed pipe sections, for example three or four, in the second embodiment. In either event the top grid-work, besides holding up the central clarifier cone, also supports and positions the vertically, downwardly disposed, peripheral aeration piping, without the need for any additional supporting or positioning elements.

It is thus an object of the present invention to provide an individual water treatment plant which is highly reliable and long-lasting, while also being economical in manufacture and installation.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED, EXEMPLARY EMBODIMENT(S)

Prior Art Application

Figure 1:
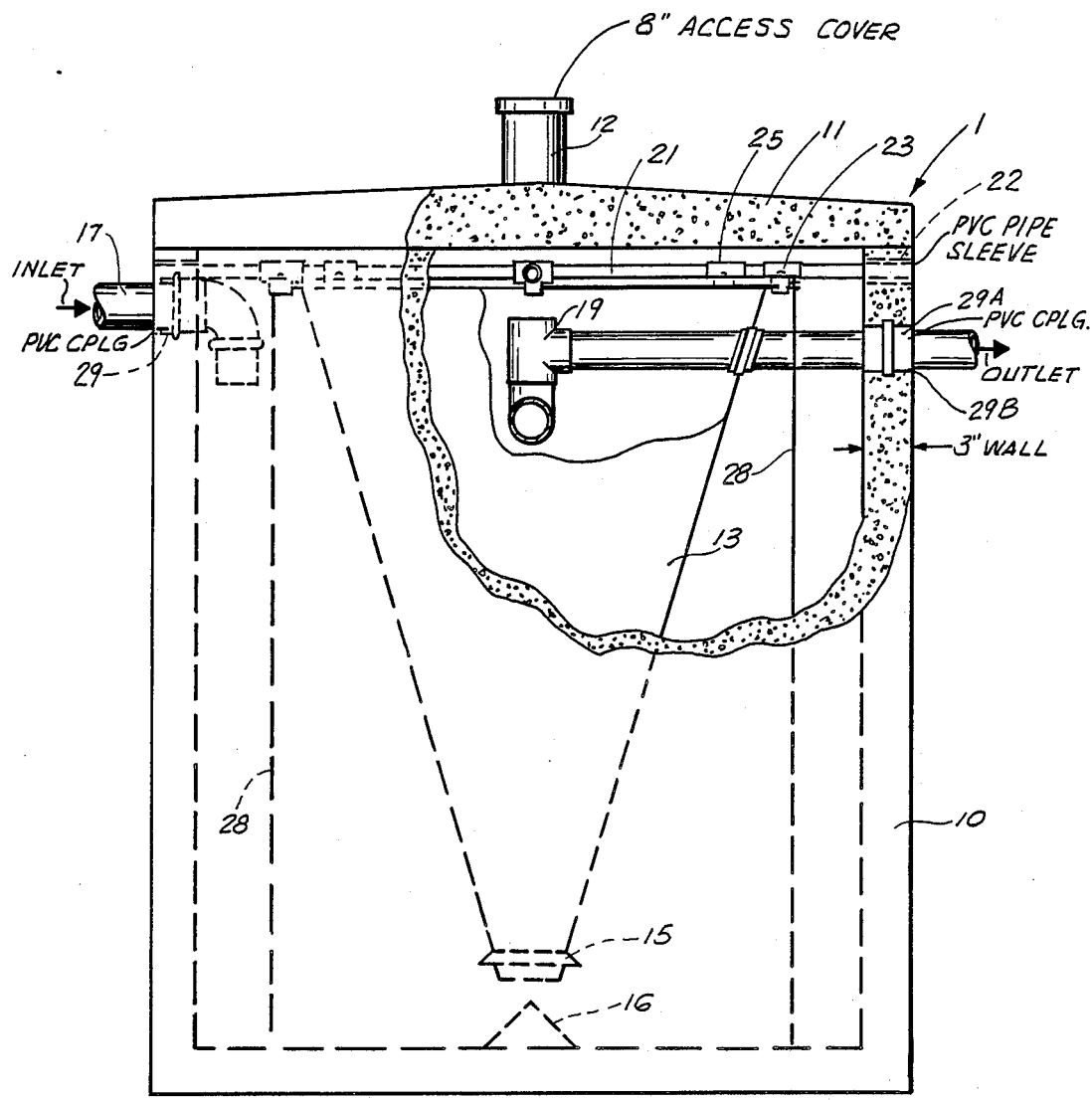
FIG. 1 is a side view, partially cut-away to show the inner elements, of the first, preferred, exemplary embodiment of the individual water treatment system of the present invention, with some of the PVC piping being schematically illustrated.
Figure 2:
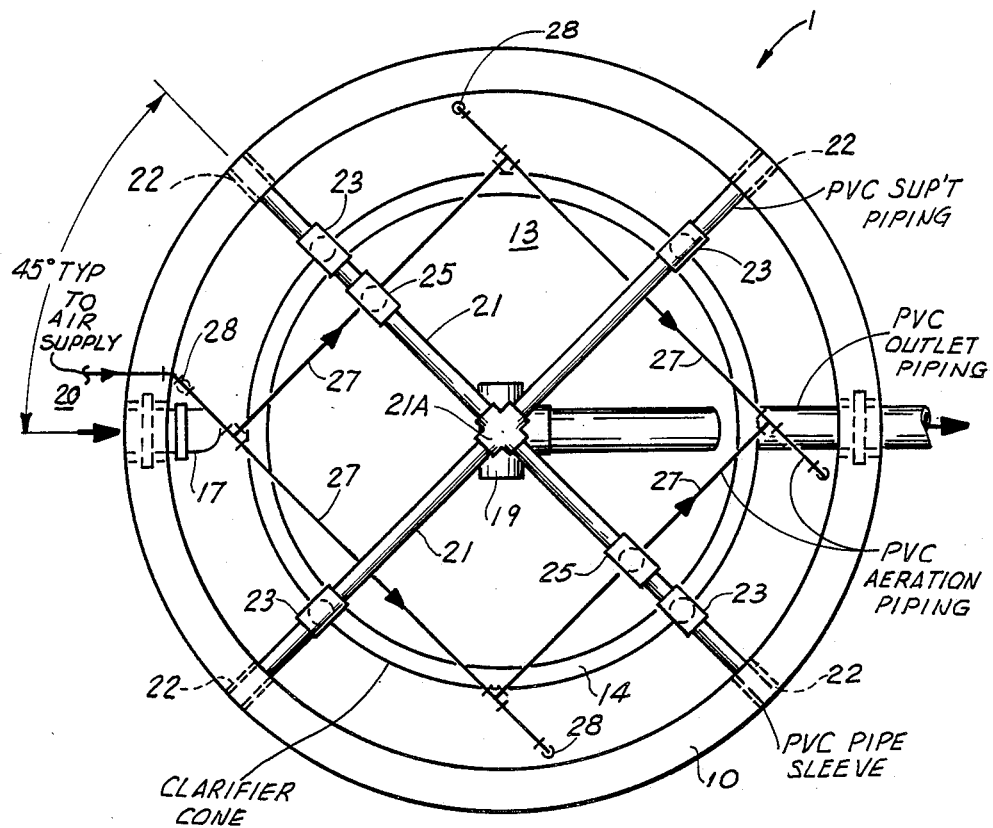
FIG. 2 is a plan view of the embodiment of FIG. 1, but with the tank top removed to show the inner elements and with the aeration piping being schematically illustrated.

As can be seen in FIGS. 1 & 2, the over-all individual water treatment system 1 of the first preferred, exemplary embodiment of the present invention, includes an outer, cylindrical treatment tank 10, which is usually buried in the ground, with an upper, concrete top or cover 11. The cover 11 included a breather or access tube 12. Concentrically located and suspended within the outer tank 10 is an inverted, conically shaped clarifier 13 typically made of fiberglass and having a flat, horizontally extended lip about its periphery.

A surrounding deflector ring 15 is typically located near the bottom opening of the clarifier 13, cooperating with the bottom deflector cone 16, to direct and guide the up-and-down, circular water flow (note directional arrows in FIG. 1) in the tank 10 between it and the outer wall of the clarifier 13, which is caused by the aeration sub-system(s) typically included in prior art systems.

A sewerage inlet line 17 is included at one side of the tank 10 near its top, and a treated water outlet line 18 is included at the upper center of the clarifier 13 to allow the treated water to rise through hydraulic displacement and enter into it for leaving the system. Typically the outlet line 18 utilizes a "T" element 19 open at its top to lead into the outlet line 18, which outlet line typically extends out through the side wall of the clarifier 13 through the concrete tank wall to the exterior. During normal, on-going or active operation, the water-line or level in the tank 10 will be somewhat static, cycling about the level of the bottom edge of the outlet pipe 18, as incoming water from the inlet line 17 causes the water in the tank to overflow through the outlet line.

An aeration system for bubbling air up through the sewage liquid is included in the form of for example four, vertically extended, down-comers positioned ninety degrees apart, which are fed by a forced air supply 20.

The foregoing represents prior art technology. For a typical five hundred gallon capacity per day system, the tank 10 could have an exemplary inner diameter of five and a half feet with three inch thick concrete walls containing an exemplary sixty-eight inch deep clarifier 13 having a nine inch diameter lower or bottom opening and a four foot diameter upper opening. Typically the systems would be made available in five hundred, one thousand and fifteen hundred gallon per day capacities.

1st Embodiment

Figure 5:
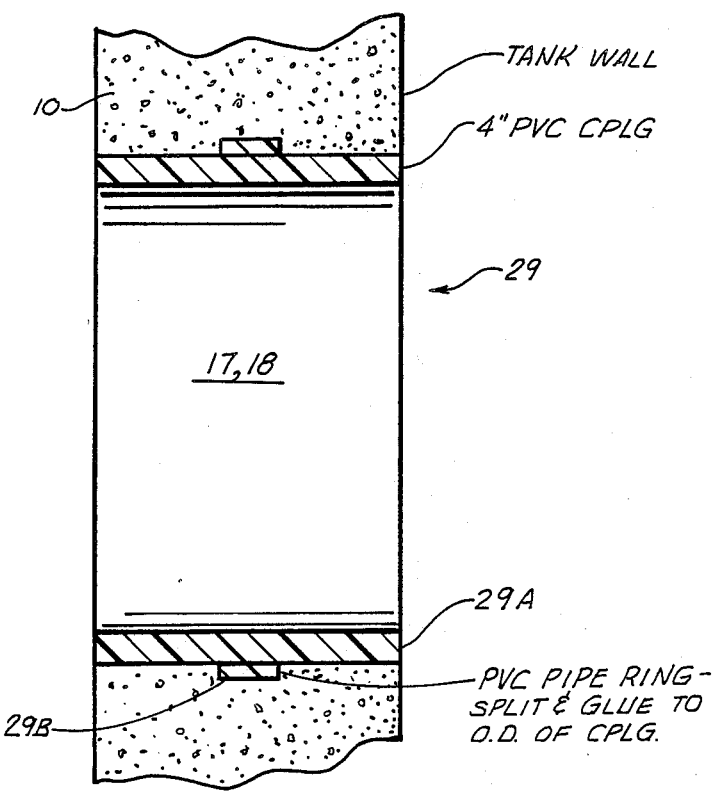
FIG. 5 is a close-up, detail, side view of the inlet/outlet coupling elements of the embodiment of FIG. 1.

In a first embodiment of the support grid-work system of the present invention, as can best be seen in FIG. 2, two radially extended cross-members 21 extend from side-to-side across the full diameter of the outer tank 10 and are anchored in the tank wall by means of embedded PVC pipe sleeves 22, similar to that shown in FIG. 5 but of a smaller diameter. The cross-members 21 are made from PVC piping, having an inner diameter of for example two inches, joined together at the center by a standard PVC cross element 21A.

Figure 4:
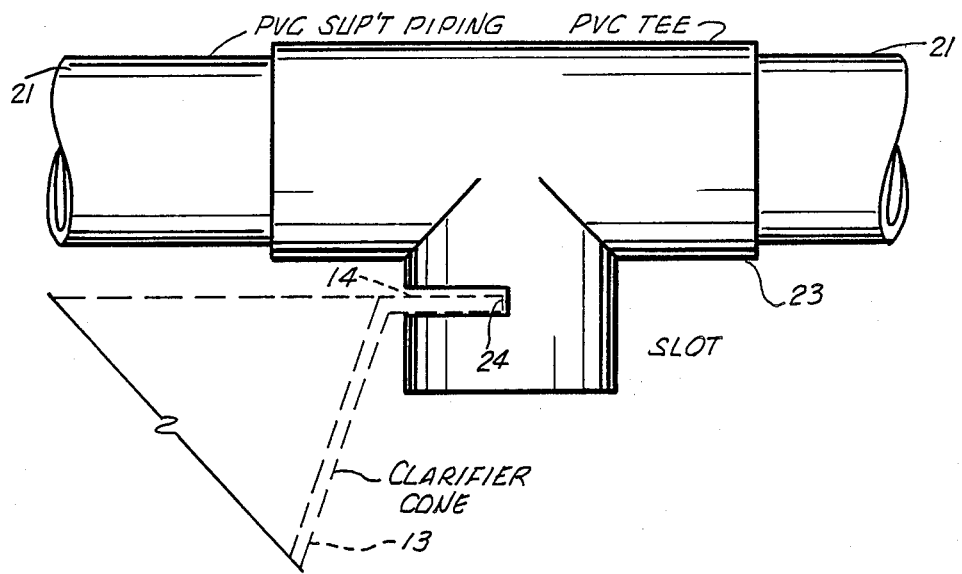
FIG. 4 is a close-up, detail, side view of one of the clarifier cone support elements of the embodiment of FIG. 1.

Four modified, inverted "T" PVC pipe elements 23, spaced ninety degrees from one another, are located on the cross-members 21 to mate with and carry the peripheral lip 14 of the clarifier 13. At least two and preferably at least three such inverted "T" element 23 should be used. As can be seen in detail in FIG. 4, each PVC "T" element 23 has a thin slot 24 in its central base leg into which the clarifier lip 14 fits. This interface provides the complete support for the clarifier 13, which is thereby suspended within the tank 10, thus providing an inexpensive, reliable, "off-the-shelf" non-corrosive support sub-system for the clarifier.

Figure 3:
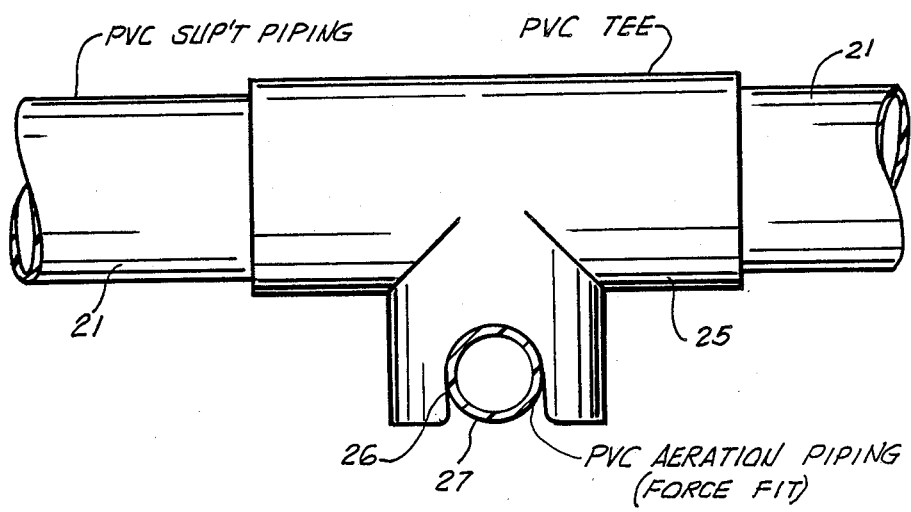
FIG. 3 is a close-up, detail, side view of one of the aeration piping anchoring and support elements of the embodiment of FIG. 1.

On the two side portions of at least one of the cross-members 21 there are included two, spaced, inverted, modified "T" elements 25 for supporting the aeration piping sub-system. Additional modified "T" elements 25 could be included if desired. As can be seen in FIG. 3, the PVC "T" elements 25 have inverted "U" shaped slots 26 formed in their central base legs into which the horizontally disposed, upper PVC aeration piping 27, typically three-quarters of an inch in inner diameter, is forced fitted.

This interface, along with the top, horizontally disposed aeration piping 27 lying across the peripheral lip 14 of the clarifier 13, provides the sole support of the four down-comers or vertical legs 28, typical being half inch inner diameter PVC piping, of the aeration piping. They along with any contact of the vertical legs 28 with the inner walls of the tank 10 firmly position, locate and hold the aeration piping in place within the tank 10, without the need of any fasteners for the legs to either the side walls or the floor of the tank 10 as in the prior art. The upper, support grid-work formed of standard PVC piping elements 21 & 25 thus provides an adequately rigid, firm but giving as necessary, support and positioning sub-system for all of the aeration piping 27 & 28 in a reliable, long-lasting and inexpensive structure. It is noted that none of the support grid-structure of the present invention that extends down into the tank 10 is fastened or fixed to the side walls or to the bottom walls of the tank.

As can best be seen in FIGS. 1, 2 & 5, the lead through couplings 29 for the inlet and outlet lines 17 & 18 each includes a PVC coupling element 29A and a split, PVC anchoring ring 29B cast in place in the concrete tank wall. This provides a secure coupling area for the lines extending through the tank walls, with the lines being adhered to the coupling element 29A by fusing adhesives.

2nd Embodiment

Figure 6:
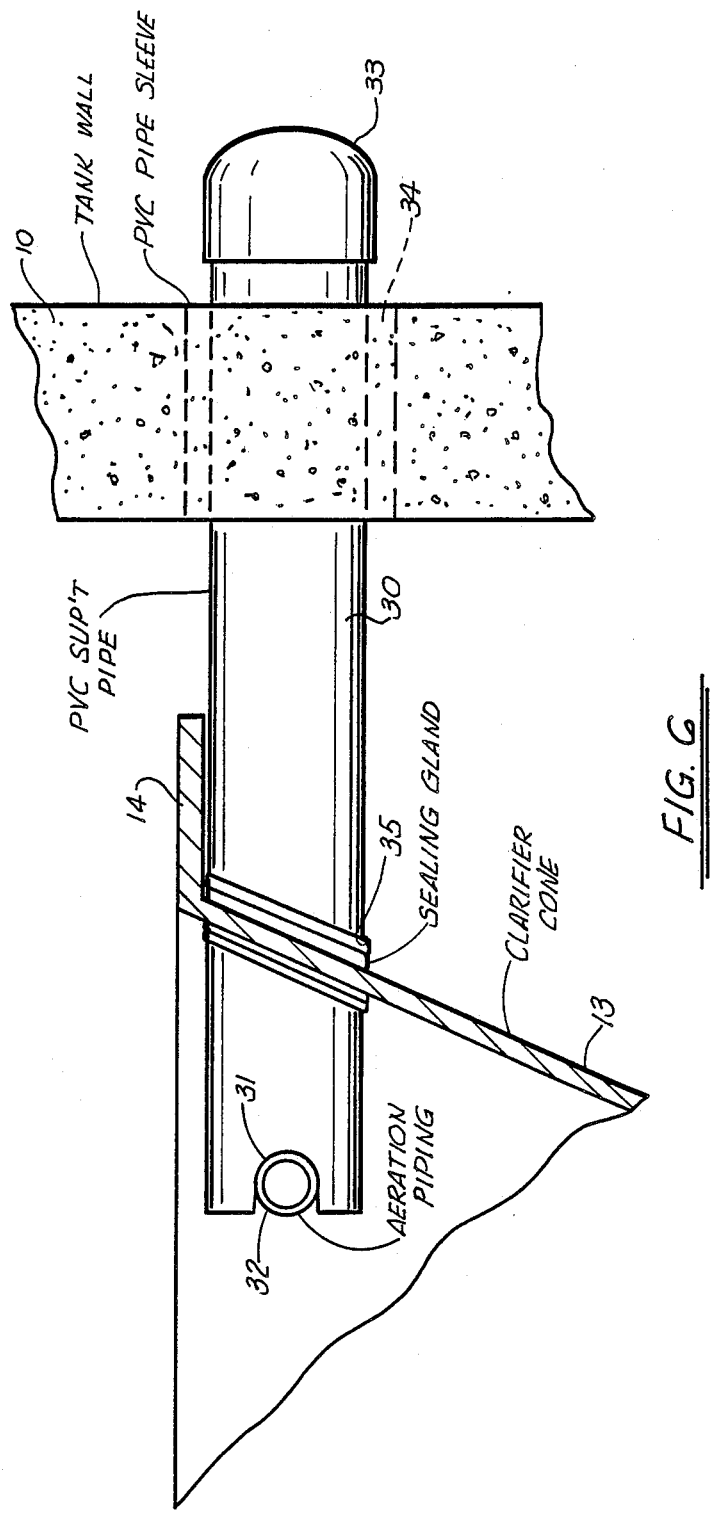
FIG. 6 is a close-up, detail, side view of an alternate embodiment of the clarifier cone support and aeration support element, as an exemplary alternate to the embodiment of FIG. 1 and the exemplary structures of FIGS. 3 & 4.

In a second embodiment of the support grid-work system of the present invention, as seen in FIG. 6, four, identical, radially extended members 30 (one being illustrated) spaced ninety degrees from one another, extend horizontally out from the wall of the tank 10 through the upper wall of the clarifier 13 terminating in a sideways "U" shaped slot 31 on the interior of the clarifier. At least two and preferably at least three radially extended members 30 should be used. Each member or support pipe section 30 extends past the clarifier wall into the clarifier only a short distance, and, unlike the first embodiment, does not extend all of the way across the full diameter of the tank 10. The PVC pipe section 30 is capped off with a sealing cap 33 at its exterior end and fits through a PVC pipe sleeve 34 in the concrete tank wall and through a sealing gland 35 in the clarifier wall.

The central portions of the four sections of the horizontally disposed aeration piping 32 (similar to sections 27 of FIG. 2) are forced fitted into the slots 31, firmly holding them in position. The end portions of the aeration piping 32 extend up and over the peripheral lip 14 of the clarifier 13, lying on it, there being sufficient rigidity to the various PVC elements to hold all of the elements in place but sufficient flexibility or "give" to the aeration piping 32 to allow it to bend or flex up over the lip. The horizontally disposed aeration pipe sections 32 are joined together near their end portions and lead into their four down-comers, in identical fashion to that illustrated for aeration piping 27 & 28 in FIGS. 1 & 2.

The four PVC pipe sections 30 thus both support the clarifier 13 in the tank 10 and support and position the aeration piping 32 along with its four vertically disposed down-comers (not illustrated, but identical to aeration piping 28 of FIG. 2). This embodiment represents the ultimate in simplicity and minimum number of parts for the two embodiments.

The embodiments described herein in detail for exemplary purposes are of course subject to many different variations in structure, design and application. Because many varying and different embodiments may be made within the scope of the inventive concept(s) herein taught, and because many modifications may be made in the embodiments herein detailed in accordance with the descriptive requirements of the law, it is to be understood that the details herein are to be interpreted as illustrative and not in a limiting sense.

What is claimed is:

1. An individual wastewater treatment plant, comprising:
    an outer tank;
    an inner clarifier section suspended and supported within said outer tank; and
    a support grid for said clarifier section carried and supported by said outer tank, said grid including at least three, peripheral spaced pipe portions, each having clarifier engagement means engaging the upper, peripheral portions of said inner clarifier section, said engagement means supporting and suspending said clarifier section down in said outer tank; wherein said clarifier section has a peripheral lip about its upper edge portion; and wherein said engagement means comporises a slot in the corresponding pipe portion mating with and holding said peripheral lip.

2. The treatment plant of claim 1, wherein said support grid is made of plastic pipe elements; and wherein said engagement means comporises at least two, peripheral spaced, inverted "T" elements, each having a thin slot in the central base leg mating with and supporting and holding said peripheral lip.

3. An individual wastewater treatment plant, comprising:
    an outer tank;
    an inner clarifier section suspended and supported within said outer tank; and
    a support grid for said clarifier section carried and supported by said outer tank, said grid including at least three, peripheral spaced pipe portions, each having clarifier engagement means engaging the upper, peripheral portions of said inner clarifier section, said engagement means supporting and suspending said clarifier section down in said outer tank; wherein there is further included an aeration piping sub-system having horizontally disposed, intersecting, aeration pipe sections located at least in part above said clarifier section and interconnected into a series of vertically disposed aeration down-comers located between said clarifier section and said outer tank; and wherein said support grid includes at least two members having slots into which said horizontally disposed, intersecting pipe sections are forced fitted, supporting and positioning said aeration sub-system in said outer tank.

4. An individual wastewater treatment plant, comprising:
    an outer tank;
    an inner clarifier section suspended and supported within said outer tank; and
    a support grid for said clarifier section carried and supported by said outer tank, said grid including at least three, peripheral spaced pipe portions, each having clarifier engagement means engaging the upper, peripheral portions of said inner clarifier section, said engagement means supporting and suspending said clarifier section down in said outer tank; wherein said support grid includes a set of radially extended, cross-members each of which extends across the full width of said outer tank and all of which are joined at their centers over the center of said clarifier section and said outer tank, the latter two being circular in horizontal cross-section and being concentrically disposed.

5. The treatment plant of claim 4, wherein said engagement means comprises at least two, peripherally spaced, support pipe sections each extending through the side wall of said clarifier, said clarifier being suspended on and supported by said pipe sections in said tank.

6. An individual wastewater treatment plant, comprising:
    an outer tank;
    an inner clarifier section suspended and supported within said outer tank; and
    a support grid for said clarifier section carried and supported by said outer tank, said grid including at least three, peripheral spaced pipe portions, each having clarifier engagement means engaging the upper, peripheral portions of said inner clarifier section, said engagement means supporting and suspending said clarifier section down in said outer tank; wherein said engagement means comprises at least two, peripherally spaced, support pipe sections each extending through the side wall of said clarifier, said clarifier being suspended on and supported by said pipe sections in said tank; and wherein there is further included an aeration piping sub-system having horizontally disposed, intersecting, aeration pipe sections located at least in part above said clarifier section and interconnected into a series of vertically disposed aeration down-comers located between said clarifier section and said tank; and wherein said support pipe sections extend only a short distance past the side wall of said clarifier into said clarifier, at least two of which each terminate in a side-ways "U" shaped slot into which said horizontally disposed, intersecting pipe sections are forced fitted, supporting and positioning said aeration sub-system in said outer tank.

7. The treatment plant of claim 6, wherein said aeration pipe sections are each made of a section of plastic pipe, the center portion of which is forced fitted into its respective slot and the end portions of which are flexed up over the top of said clarifier section.

8. An individual wastewater treatment plant, comprising:
   an outer tank;
   an inner clarifier section suspended and supported within said outer tank, said clarifier section having a peripheral lip about its upper edge portion;
   an aeration piping sub-system having horizontally disposed, intersecting, aeration pipe sections located at least in part above said clarifier section and interconnected into a series of vertically disposed aeration down-comers located between said clarifier section and said outer tank; and
   a support grid made of plastic pipe elements for said clarifier section carried and supported by said outer tank, said grid including at least three, peripheral spaced pipe portions, each having clarifier engagement means engaging the upper, peripheral portions of said inner clarifier section, said engagement means supporting and suspending said clarifier section down in said outer tank, said engagement means comprising at least three, peripheral spaced, inverted "T" plastic pipe elements each having a thin slot in the central base leg mating with and supporting and holding said peripheral lip of said clarifier section, said support grid further including at least two members having inverted "U" shaped slots into which said horizontally disposed, intersecting pipe sections are forced fitted, said support grid also supporting and positioning said aeration sub-system in said outer tank.

9. An individual wastewater treatment plant, comprising:
   an outer tank;
   an inner clarifier section suspended and supported within said outer tank;
   an aeration piping sub-system having horizontally disposed, intersecting, aeration pipe sections interconnected into a series of vertically disposed aeration down-comers located between said clarifier and said tank; and
   a support grid for said clarifier section carried and supported by said outer tank, said grid including at least three, peripheral spaced, support pipe portions, each having clarifier engagement means engaging the upper, peripheral portions of said inner clarifier section, said engagement means supporting and suspending said clarifier section down in said outer tank, said engagement means comprising at least three, peripheral spaced, support pipe sections each extending through the side wall(s) of said clarifier, said clarifier being suspended on and supported by said support pipe sections in said tank, said support pipe sections extending only a short distance past the side wall of said clarifier into said clarifier, at least two of which each terminate in a side-ways "U" shaped slot into which said horizontally disposed, intersecting pipe sections are forced fitted, supporting and positioning said aeration sub-system in said outer tank, said aeration pipe sections are each made of a section of plastic pipe, the center portion of which is forced fitted into its respective slot and the end portions of which are flexed up over the top of said clarifier section.

* * * * *